United States Patent [19]

Koechner

[11] Patent Number: 4,598,202
[45] Date of Patent: Jul. 1, 1986

[54] NUCLEAR AND PRESSURE SENSITIVE LINE/PERIMETER DETECTION SYSTEM

[76] Inventor: Walter Koechner, 1054 Harriman St., Great Falls, Va. 22066

[21] Appl. No.: 615,336

[22] Filed: May 30, 1984

[51] Int. Cl.⁴ .............................................. G01T 1/20
[52] U.S. Cl. ................................. 250/366; 250/367; 250/368; 250/369; 340/522; 340/600
[58] Field of Search ............... 250/368, 486.1, 361 R, 250/336.1, 369, 366, 367, 388; 340/522, 600, 665, 666

[56] References Cited

U.S. PATENT DOCUMENTS

| | | | |
|---|---|---|---|
| 3,265,892 | 8/1966 | Sheldon | 250/361 R |
| 3,435,221 | 3/1969 | Swift | 378/56 |
| 4,358,678 | 11/1982 | Lawrence | 250/227 |
| 4,413,184 | 11/1983 | Marrone | 250/368 |
| 4,415,810 | 11/1983 | Brown, Sr. | 250/486.1 |
| 4,471,223 | 9/1984 | Hurst et al. | 250/368 |

FOREIGN PATENT DOCUMENTS

| | | | |
|---|---|---|---|
| 57-50672 | 3/1982 | Japan | 250/368 |
| 786198 | 11/1957 | United Kingdom | 250/336.1 |

Primary Examiner—Carolyn E. Fields
Attorney, Agent, or Firm—Watson, Cole, Grindle & Watson

[57] ABSTRACT

A system for simultaneously detecting nuclear radiation and pressure combines light signals from a radiation sensitive scintillating optical fiber with light signals from a pressure sensitive optical fiber. The scintillating fiber is coupled to a light transmitting optical fiber for long distance light transmission to a detector unit such as a photomultiplier tube. The concurrent detection of radiation and pressure of radiation and pressure is used to trigger an alarm signal.

12 Claims, 2 Drawing Figures

NUCLEAR AND PRESSURE SENSITIVE LINE/PERIMETER DETECTION SYSTEM

BACKGROUND OF THE INVENTION

1. Field of the Invention

This invention concerns a detection system using scintillating materials which emit photons upon absorption of nuclear radiation. More particularly, such materials are employed as sensitive nuclear radiation detectors wherein an organic scintillator embedded in a polymer is fabricated as an optical fiber. The light from the scintillating materials is coupled to an ultraviolet transmitting optical fiber for long distance light transmission to a detector unit.

2. Description of the Prior Art

The purpose of any radiation detector is to convert the ionization produced by radiation into a detectable signal. In the case of gamma ray interactions there are three processes of significance, photoelectric interaction, Compton scattering, and pair production. All gamma ray detectors utilize at least one of these processes to obtain a measurable output signal. Common nuclear detection instruments include gas-filled counters, scintillation counters, and semiconductor detectors.

Gas-filled detectors are widely used for gamma-ray detection. Specific examples are ion chambers, proportional counters and Geiger-Mueller counters. Gamma-rays cause ionization of the gas used in these counters. This ionization, in combination with a high voltage applied to the electrodes located inside the gas chambers, leads to a measureable electrical current flow.

In a scintillation counter the detecting medium is a solid or liquid rather than a gas and the detection efficiency is correspondingly higher because of the increased density of the detecting medium. The most commonly used scintillation material is sodium iodide activated with thallium. In all scintillation systems a volume of scintillator material is viewed by a photomultiplier tube which detects the optical photons emitted from the scintillator as a result of the interaction with gamma-rays.

The principle of operation of a semiconductor detector is similar to that of a gas-filled detector except that the detecting medium is a solid. An applied electric field sweeps out free electrons and holes, producing a depletion layer containing practically no free-charged carriers.

Geiger-Muller tubes, sodium-iodide (NaI) scintillators and germanium drifted or doped lithium (Ge/Li) detectors can be designed to have about the same sensitivity as the device developed according to the present invention. However, for a number of applications such conventional detectors exhibit several disadvantages. All three types of detectors are point sensors which measure radiation at required low levels only within a limited area or point around the immediate vicinity of the detector.

All three detectors also have very delicate electronics directly connected to the radiation sensor. This poses potential problems with regard to their deployment. The integral combination of sensor and process electronics results in a relatively large device which cannot be easily placed. Such devices are also susceptible to electromagnetic interference, dirt, vibration, etc., which further limits their placement.

Lithium drifted germanium detectors are somewhat inconvenient in that they must be continuously stored and operated at cryogenic temperatures in order to preserve the lithium profile or distribution within the germanium. Normally, these detectors are operated in a vacuum chamber with liquid nitrogen cooling. Although a Peltier-type cooler could probably be developed for this detector, its electric power consumption and complexity rule out this detector for the intended applications noted below.

SUMMARY OF THE INVENTION

The combination of a highly radiation sensitive organic scintillator with the superior light transmission properties of optical fibers results in a nuclear radiation fiber optic detector which is at least four orders of magnitude more sensitive compared with fiber optic dosimeters based on changes in light transmission as a result of nuclear radiation.

A radiation sensor having high sensitivity and small volume is obtained by combining the excellent light propagation properties of optical fibers with the sensitive detection capability of organic scintillator materials. Pressure may also be measured in a pair of fibers by sensing light transmission losses due to the microbending effect wherein the cladding index of refraction changes when the fiber bends to a point where light is lost. Minute pressure changes are detected by a differential light transmission measurement. The coincident or simultaneous measurement of nuclear radiation and pressure reduces system error as well as the false alarm rate if the system includes an alarm. Only if both the radiation and pressure detectors indicate a stimulus is an event recorded.

The nuclear radiation sensor according to this invention includes a thin cable of scintillating material which can be laid across the street, hung from the ceiling of a tunnel or overpass, mounted underneath a bridge, etc. so that the distance between the sensor cable and radiation source can be minimized. Fiber optic transmission of the signals from the scintillating material allows for a remote location of signal processing and read-out devices at a convenient and protected area.

The key elements of the instrument according to the invention are several highly radiation sensitive fibers packaged inside a thin shielded cable, a micro-channel photomultiplier tube, signal processing electronics and a read-out device. In addition, a pressure sensitive fiber placed either inside the shielded cable or external to it will enable the coincident detection of nuclear radiation and pressure associated with the force exerted on the ground by, for example, a vehicle. An electronic subsystem allows for a remote signal read-out location. The remote read-out can be accomplished by interrogation of the detecting instrument by a RF channel or optically with a laser beam. Data transmission can be via radio frequencies or a laser diode optical link.

The nuclear radiation detector according to the invention has several significant advantages over existing devices such as ionizing chamber devices. The sensor is not affected by electric or magnetic fields and transients, smoke, dirt or vibrations because the electronics can be placed remotely from the sensing fiber and located at a convenient and sheltered place. The nuclear radiation detector is configured as a line detector which detects radiation along a line rather than at a point as does a point sensor. Moreover, the detector can measure or monitor nuclear radiation over a large area or across a perimeter.

The radiation sensitive cable can be of very small dimensions and can easily be laid out or routed around obstacles or placed unobtrusively in difficult to reach places, thereby allowing great flexibility in locating the sensor. The combination of a radiation and pressure sensitive probe results in a detector with a very low false alarm rate. The results of the measurements can be stored in an electronic subsystem and can be read out either directly or by remote interrogation.

Different types of electronic processing systems are possible such as digital or analog signal processing. The device can include a threshold detection device which triggers an alarm if a predetermined threshold radiation value is exceeded. Information may be electronically stored and read out after the device is interrogated. The system can be configured to respond to short transient changes in the nuclear background or slow and gradually occuring events.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
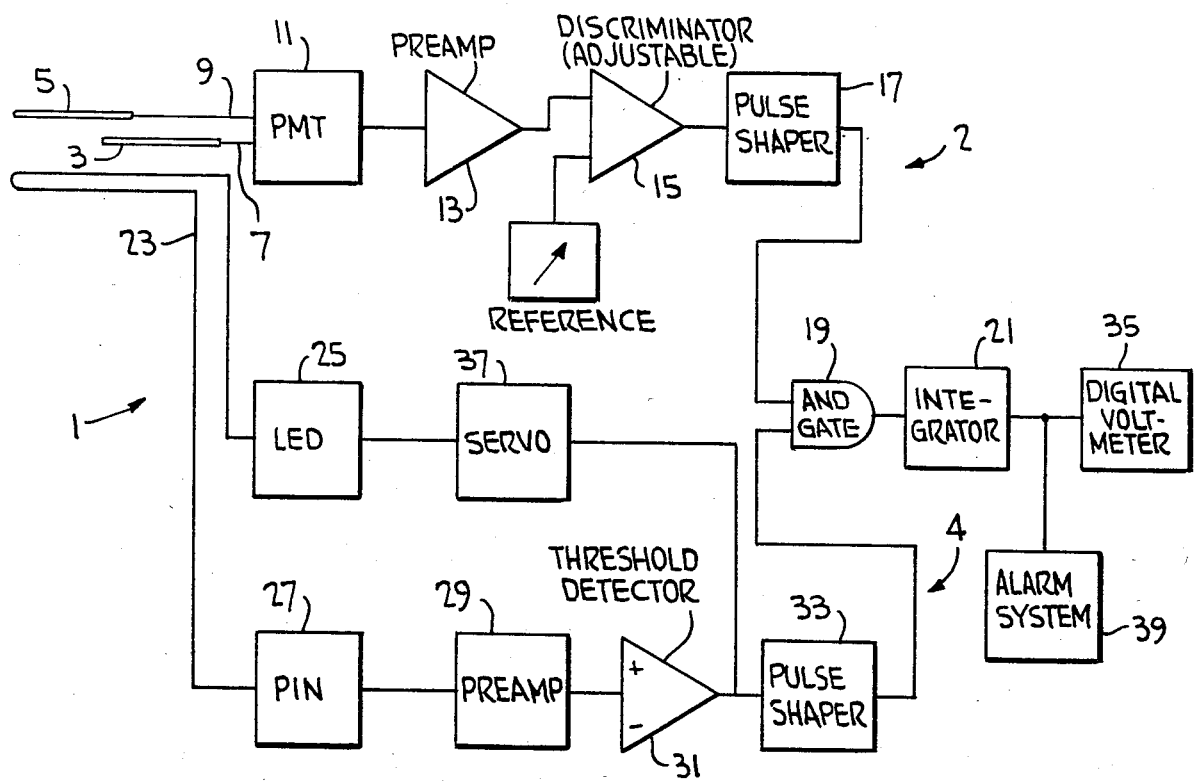
FIG. 1 is a schematic block diagram of the nuclear detector.

A nuclear radiation and pressure sensing system 1 is schematically shown in FIG. 1 in block diagram form. The overall system 1 includes two major subsystems. The first major subsystem includes a radiation sensitive circuit 2 while the second major subsystem includes a pressure sensitive circuit 4. The general configuration of circuit 2 includes at least one and preferably at least two radiation sensitive fibers 3,5, each several meters long since the light generated in the scintillating fiber may have a length of a few meters. Fibers 3,5 are coupled to light transmitting optical fibers 7,9 for propagation of scintillating photons to a detector 11. The transmitted light may be in the ultraviolet range. The detector includes either a conventional or a micro-channel plate photomultiplier tube (PMT) 11. The PMT 11 is connected to a preamplifier 13 which provides an input to an adjustable discriminator 15. The signal from the discriminator is sent to a pulse generator or shaper 17. A rate-meter and digital/analog read-out may also be provided.

The fluorescent photons emitted by the scintillation fibers 3,5 are converted into electrical pulses by the photomultiplier tube 11 such as an RCA, Model 8850. The sharp voltage peaks corresponding to individual electron bursts which appear at the PMT anode are amplified with preamplifier 13 by a factor 100 to 1000. Preamplifier 13, such as Hammatsu C716 series, removes low frequency fluctuations because of the low frequency cut-off response of the amplifier. The amplified pulses are fed to discriminator 15.

Discriminator 15 such as, for example, Thorn EMI Gencom Inc., Model AD-100, is threshold sensitive and emits an output pulse only when the input pulse exceeds a given amplitude. For each input pulse that exceeds the threshold value, the discriminator emits an output pulse. The threshold of the discriminator is adjustable as indicated by the adjustable reference value depicted in FIG. 1.

The output from the discriminator 15 triggers a monostable multivibrator 17 which produces pulses of constant amplitude and duration independent of the magnitude and duration of the input. This multivibrator or pulse shaper 17 is normally an integral part of the discriminator 15, for example, Thorn EMI Gencom, Inc., Model AD-100.

In an analog section of the system the pulses are directed to an integrator circuit 21 via electronic logic such as AND gate 19 for coincidence detection of the pressure sensor. In the integrator circuit 21 a capacitor is charged and the voltage across the capacitor provides a voltage proportional to the pulse rate. Pulses can also be counted in a standard pulse counter for direct digital display. Analog and digital photon counters are commercially available from a large number of suppliers, such as for example, EG&G, Princeton Applied Research, Model 1109 Photon Counter, PHOTON EMI Gencom, Inc., Photon Counter Model C-10.

The pressure sensitive fiber detector includes a pressure sensitive optical fiber 23 for example, a low-loss silicone polymer clad glass core fiber, such as Fiber Industries type superguide B. However, the operation of the invention is not dependent on a specific type of fiber.

One end of the fiber 23 is connected to a light emitting diode (LED) 25 which may be a Honeywell Fiber Optic LED type SE4352-003 for providing a reference light signal source. The other end of the pressure sensitive fiber 23 is connected to a light receiver 27. The first element in the receiver is a photodiode (PIN). The photo diode may be a Honeywell fiber optic detector, PIN diode type SD3478-002.

The anode of the photodiode 27 operated in the photovoltaic mode is connected to the input leads of an operational amplifier 29 for amplification of the signal level (Preamp.) The operational amplifier 29 is commercially available as integrated circuit, Operational Amplifier Model LF353, from National Semiconductors.

This particular device uses field effect transistor technology to provide a high impedance input combined with low noise. The output from the preamplifier is connected to a threshold detector 31. The threshold level of the detector 31 is adjustable with a potentiometer. If the input from the preamplifier 29 deviates from the signal of a reference source, the threshold detector 31 will generate a large output signal. The threshold detector 31 may use operational amplifier MC1741 from Motorola.

The output of the threshold detector 31 is connected to an output signal pulse shaper 33. This device provides an output signal of fixed duration every time the threshold device generates an output signal. The pulse shaper which includes a monostable multivibrator, is available as timer chip NE555 from Signetics.

The output from the pulse shaper is directed to the logic AND gate 19 such as Radio Shack Model 4066. Only if a signal from the pressure circuit loop 4 is present at the AND gate 19 will the signal from the nuclear sensitive circuit loop 2 be transmitted by the AND gate 19 to the pulse integrator 21 and read-out device such as digital voltmeter 35.

The purpose of the servo control 37 is to compensate for long term drifts in the transmission properties of the fiber 23. These changes can occur due to environmental changes such as temperature and the like. It is very important that the light input to the photo diode 27 remains constant without affecting the transient response obtained from a pressure impulse on the fiber 23.

The LED transmitter 25 is activated by a current stabilized pulse generator (not shown). The radiation received by the photo diode 27 is compared to a reference signal. Small deviations are sensed by the servo control 37 and used to adjust the current in the LED 25 until the system is balanced again with respect to a reference signal.

The response time of the servo loop in servo 37 is very slow, on the order of several seconds; thus, any sudden change in light transmission due to a pressure stimulus is not acted upon by the servo loop. The servo control circuit is essentially an operational amplifier, such as Motorola Mc1741, operated in a voltage integration mode.

An alarm device 39 may be connected to the output of integrator 21 to generate an alarm signal upon receiving a signal of predetermined magnitude.

Figure 2:
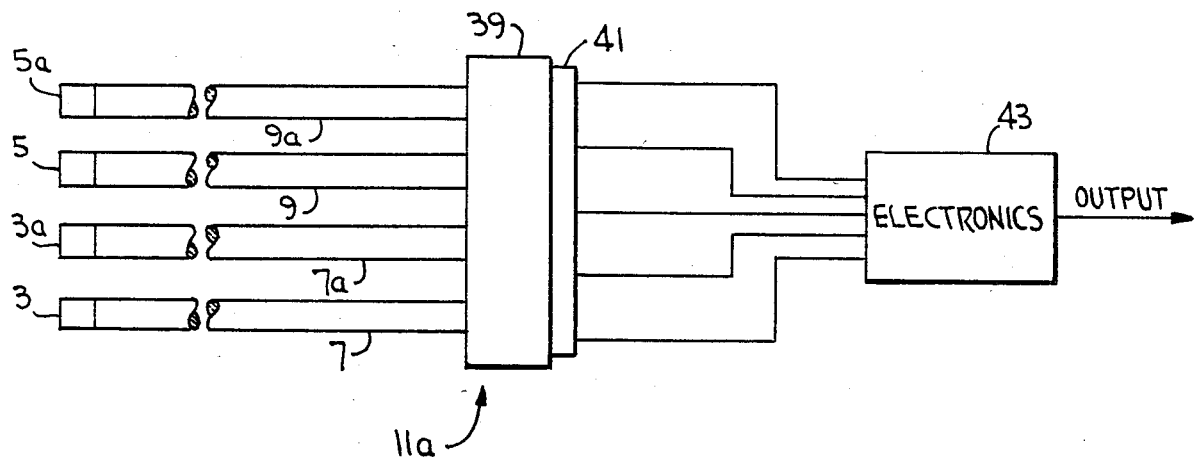
FIG. 2 is a schematic diagram of the interconnection of the scintillating fibers with a micro-channel plate having a segmented anode.

In order to optimize the signal to noise ratio, each fiber 3,5 of the radiation sensitive circuit 2 should be connected to an individual detector and an individual preamplifier. This can be accomplished very easily by connecting the fiber optic bundle to a micro-channel plate PMT with a segmented anode or with a sensitive anode with multielectrode read-out as shown in FIG. 2. Also, a Channeltron or micro-channel plate with electronic read-out, such as in an image intensifier/TV vidicon combination, can be employed to provide a low level light detection device.

In either case, the output from an individual scintillator/fiber combination produces one distinct electron charge on the PMT anode which can be read out. This improves the signal to noise ratio because the other fibers do not contribute to the background noise. Furthermore, the fact that an electron charge at a particular point of the anode is associated with a particular fiber will provide the exact location of the nuclear source.

FIG. 2 shows several scintillator fibers 3, 3a, 5, 5a, connected via low loss light transmission fibers 7, 7a, 9, 9a to a micro-channel photo multiplier tube 11a which may be ITT Electro-Optical Products Div. Model F4146 imaging photon counting device. This photo multiplier 11a is proximity focused with an end-on photo cathode coupled to stacks of micro-channel plates 39 and a two-dimensional resistive anode encoder 41.

Each radiation sensitive fiber 3, 3a 5, 5a is coupled to one segment of the micro-channel PMT 11a. The output from each segment is connected to a multichannel preamplifier 43. This amplifier 43 is also commercially available from ITT, as Model F14646 M Encoder which combines the outputs from the various segments to one output signal which is then processed as shown in FIG. 1.

The difference between the PMT 11 shown in FIG. 1 and a segmented multichannel PMT 11a shown in FIG. 2 is the fact that the latter device will provide an indication which fiber received a nuclear stimulus. This feature is provided by the encoder which not only generates an amplified signal output, but also a logic signal which identifies the channel which received an input signal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A nuclear radiation and pressure sensitive line/-perimeter detection system, comprising:
   a radiation sensitive circuit comprising: at least one nuclear-radiation sensitive fiber for producing scintillating photons in the presence of nuclear radiation; said fiber comprising an organic scintillator embedded in a polymer forming an elongated cable; at least one light-transmitting optical fiber optically connected to said radiation sensitive fiber for propagation of said photons; detector means connected to said optical fiber and comprising a photomultiplier means for receiving said photons; electronic means operatively associated with said radiation sensitive fiber for receiving signals generated thereby;
   a pressure sensitive circuit comprising: a pressure sensitive fiber, in the form of an elongated cable, operatively associated with said radiation sensitive fiber for detecting pressure; said electronic means being operatively associated with said pressure sensitive fiber for receiving signals generated thereby; a read-out device electrically connected to said electronic means, said electronic means including logic means comprising an AND gate for transmitting a signal from said radiation sensitive circuit to said read-out device only if a signal from said pressure sensitive circuit is present at said AND gate.

2. The system according to claim 1, wherein said at least one radiation sensitive fiber comprises a plurality of nuclear radiation sensitive fibers, said at least one optical fiber comprising a plurality of light transmitting optical fibers respectively connected to said radiation sensitive fibers, said photomultiplier means comprising a microchannel plate photomultiplier tube connected to said light transmitting fibers for providing an indication which of said radiation sensitive fibers received a nuclear stimulus, and said electronic means further including an encoder for generating an amplified signal output and a logic signal identifying the channel which receives an input signal from said radiation sensitive fibers.

3. The system according to claim 1, further comprising integrator means electrically connected to an output of said AND gate, said read-out device being operatively associated with said integrator means.

4. The system according to claim 1, wherein said electronic means further includes preamplifier means electrically connected to said photomultiplier means.

5. The system according to claim 4, wherein said electronic means further includes discriminator means electrically connected to said preamplifier means.

6. The system according to claim 5, wherein said electronic means further includes pulse shaping means electronically connected to said discriminator means.

7. The system according to claim 1, wherein said electronic means further includes light emitting means optically connected to one end of said pressure sensitive fiber.

8. The system according to claim 7, wherein said electronic means further includes light receiving means optically connected to the other end of said pressure sensitive fiber.

9. The system according to claim 8, wherein said electronic means further includes control means electrically connected to said light emitting means for controlling light intensity thereof.

10. The system according to claim 9, wherein said electronic means further includes preamplifier means electrically connected to said light receiving means.

11. The system according to claim 10, wherein said electronic means further includes threshold detection means electrically connected to said preamplifier means.

12. The system according to claim 11, wherein said electronic means further includes pulse shaper means electrically connected to said threshold detection means.

* * * * *